United States Patent
Mahendru et al.

(10) Patent No.: US 6,682,429 B2
(45) Date of Patent: Jan. 27, 2004

(54) SHAFT WITH A VENTING SYSTEM

(75) Inventors: Subash K. Mahendru, Rochester, MI (US); Praveen Gupta, Troy, MI (US); Gary Parker, Shelby Township, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/172,538

(22) Filed: Jun. 13, 2002

(65) Prior Publication Data

US 2003/0232652 A1 Dec. 18, 2003

(51) Int. Cl.[7] ................................................. F16C 3/03
(52) U.S. Cl. .......................................... 464/17; 464/175
(58) Field of Search .......................... 464/17, 162, 175, 464/185, 180

(56) References Cited

U.S. PATENT DOCUMENTS

| | | |
|---|---|---|
| 1,541,007 A | 6/1925 | Thiemer |
| 1,949,500 A | 3/1934 | Swenson |
| 1,950,579 A | 3/1934 | Swenson |
| 2,510,362 A | 6/1950 | Anderson |
| 2,769,457 A | 11/1956 | Wittenberg |
| 3,063,266 A | 11/1962 | Rabson |
| 3,454,182 A | 7/1969 | Morton |
| 3,813,899 A | 6/1974 | Abrahamer |
| 3,942,336 A * | 3/1976 | Schultenkamper .......... 464/162 |
| 4,003,219 A | 1/1977 | Stull |
| 4,084,536 A | 4/1978 | Stansbury |
| 4,153,260 A | 5/1979 | Joyner |
| 4,215,869 A | 8/1980 | Pendleton |
| 4,308,729 A * | 1/1982 | Condon ....................... 464/16 |
| 4,416,445 A | 11/1983 | Coad |
| 4,460,182 A | 7/1984 | Brissette |
| 4,508,522 A | 4/1985 | Numazawa et al. |
| 4,516,959 A | 5/1985 | Krude |
| 4,529,213 A | 7/1985 | Goodman |
| 4,582,484 A | 4/1986 | Sandor |
| 4,819,755 A | 4/1989 | Smemo et al. |
| 4,895,391 A | 1/1990 | Groat |
| 4,945,745 A | 8/1990 | Bathory et al. |
| 4,957,459 A | 9/1990 | Snyder |
| 5,027,784 A | 7/1991 | Osawa et al. |
| 5,230,658 A | 7/1993 | Burton |
| 5,299,982 A | 4/1994 | Burton |
| 5,342,282 A | 8/1994 | Letourneur |
| 5,419,741 A | 5/1995 | Schwarzler |
| 5,525,112 A | 6/1996 | Smith |
| 5,655,968 A | 8/1997 | Burton |
| 5,716,276 A | 2/1998 | Mangas et al. |
| 5,752,866 A | 5/1998 | Takahashi et al. |
| 5,772,520 A | 6/1998 | Nicholas et al. |

(List continued on next page.)

FOREIGN PATENT DOCUMENTS

| | | |
|---|---|---|
| DE | 1 475 963 | 2/1965 |
| FR | 1 237 637 | 10/1959 |
| FR | 1 417 355 | 10/1964 |

*Primary Examiner*—Lynne H. Browne
*Assistant Examiner*—Kenneth Thompson
(74) *Attorney, Agent, or Firm*—Brinks Hofer Gilson & Lione

(57) ABSTRACT

A shaft for a vehicle including a first member having an internal spline and defining an inner cavity, a second member having an external spline, and a boot mounted over the vent and adapted to substantially prevent contaminants from entering the inner cavity through the vent. The external spline of the first member and the internal spline of the second member cooperatively allow an axial sliding movement of the second member into the inner cavity of the first member and substantially prevents rotational movement between the first and second members. One of the first and second members defines a vent communicating with the inner cavity. The first and second members and the boot cooperatively form a substantially airtight enclosure.

7 Claims, 3 Drawing Sheets

U.S. PATENT DOCUMENTS

| | | |
|---|---|---|
| 5,836,824 A | 11/1998 | Konegen et al. |
| 5,845,911 A | 12/1998 | Gimino |
| 5,904,622 A | 5/1999 | Breese et al. |
| 5,931,738 A | 8/1999 | Robb |
| 5,961,388 A | 10/1999 | Breidenbach et al. |
| 6,023,830 A | 2/2000 | Cole et al. |
| 6,123,622 A | 9/2000 | Mikeska et al. |
| 6,159,104 A | 12/2000 | Mikeska et al. |
| 6,179,717 B1 | 1/2001 | Schwarzler |
| 6,193,612 B1 | 2/2001 | Craig et al. |
| 6,195,991 B1 | 3/2001 | De Shon |
| 6,279,221 B1 | 8/2001 | Glowacki et al. |
| 6,516,829 B1 | 2/2003 | Townsend et al. |

\* cited by examiner

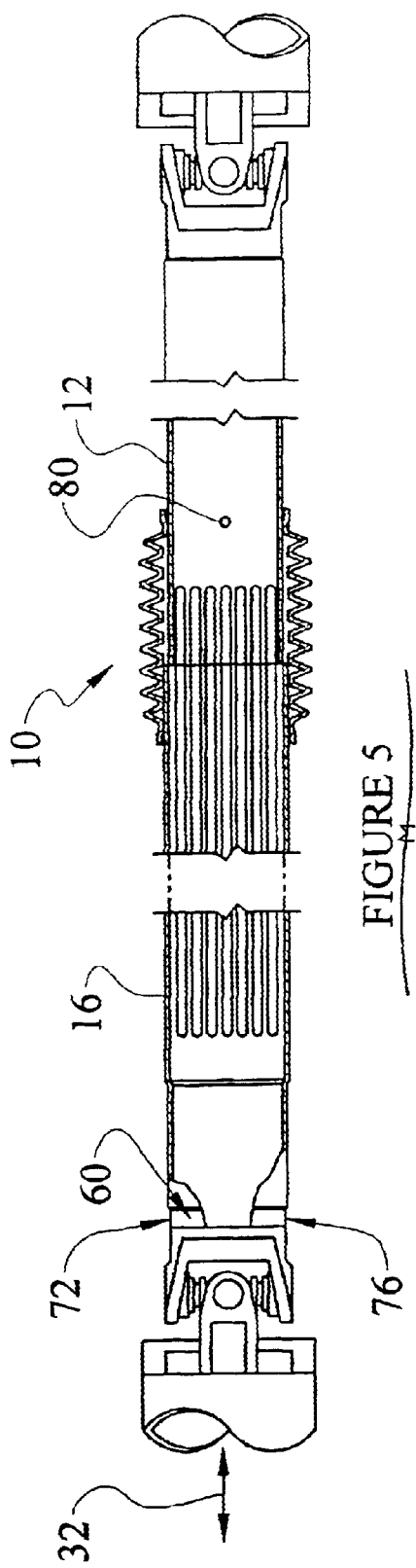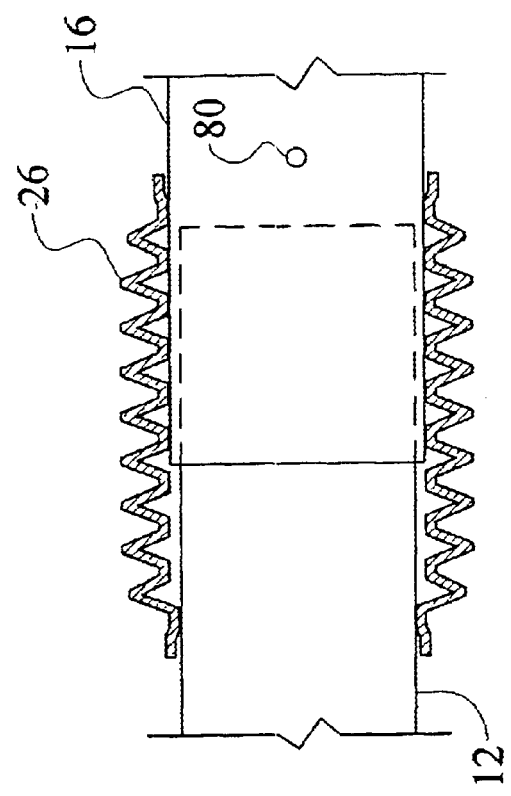

SHAFT WITH A VENTING SYSTEM

BACKGROUND OF THE INVENTION

This invention relates generally to a venting system for use in a double-tube "slip-in-tube" shaft.

U.S. Pat. No. 6,279,221 ("the '221 patent"), issued Aug. 28, 2001, for a double-tube "slip-in-tube" vehicle shaft, is hereby incorporated in full by this reference. A double-tube "slip-in-tube" vehicle shaft includes first and second members each having splined portions. The second member is telescopically positioned within the first member. The splined portion of the first member cooperates with the splined portion of the second member to form the shaft. The cooperating splined portions of the first and second members, however, allow external elements to enter into the double-tube vehicle shaft at the location of the intermeshing splines.

In order to prevent contaminants from entering the shaft, a boot is mounted to the shaft where the second member slips into the first member. The boot may be attached to the first and second members in a substantially airtight configuration, which prevents contaminating particles from entering the shaft.

A slip-in-tube shaft contains, depending on diameter and length, approximately 8 to 16 liters of air sealed inside it during assembly. Shaft working temperature varies continuously depending on ambient temperature, driving conditions, momentary torsional load, and depth and frequency of shaft plunging action. These temperature changes affect the internal air pressure inside the shaft tube. In addition, the air column inside the tube experiences compression and decompression by reversing, at various frequencies, plunging motions of the shaft. Those factors cause, at certain frequencies, the air column inside the tube to vibrate and resonate within the shaft, thereby creating shaft noise and boom, which can degrade driveline noise, vibration, and harshness (NVH) performance. In addition, the air inside the tube can create hydraulic lock and resist manual shaft length adjustment for its installation during vehicle final assembly, which can make the installation of the shaft difficult.

BRIEF DESCRIPTION OF THE DRAWINGS

FIG. 5 is an assembled side view of the shaft shown in FIG. 1 plus the venting system of the present invention; and FIG. 6 is an assembled side view of the shaft shown in FIG. 5, wherein the second member is at the end of a plunging action.

DETAILED DESCRIPTION OF THE PREFERRED EMBODIMENT

Figure 1:
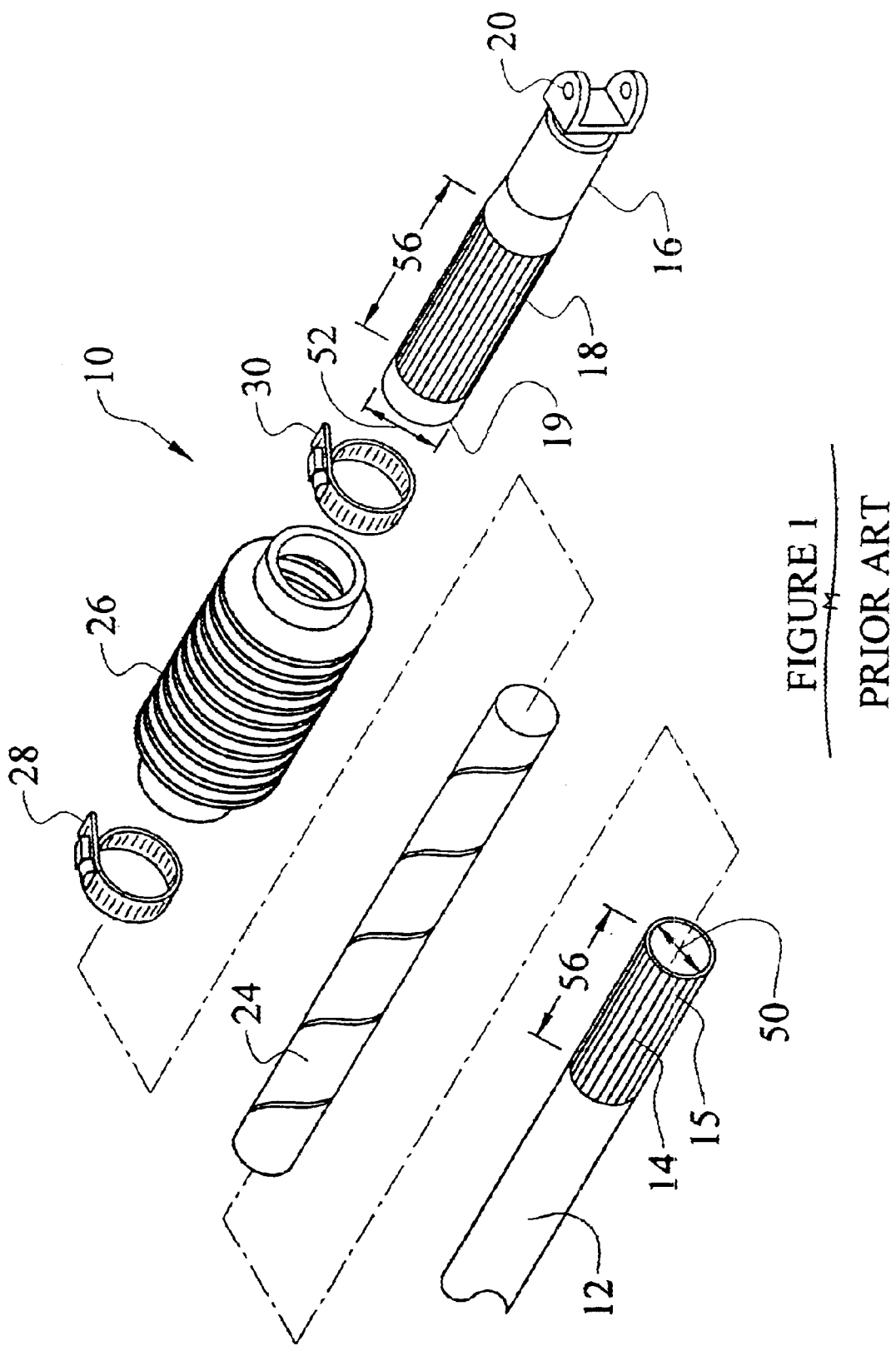
FIG. 1 is an unassembled perspective view of the prior art, for a slip-in-tube vehicle shaft, as shown in the '221 patent.
Figure 2:
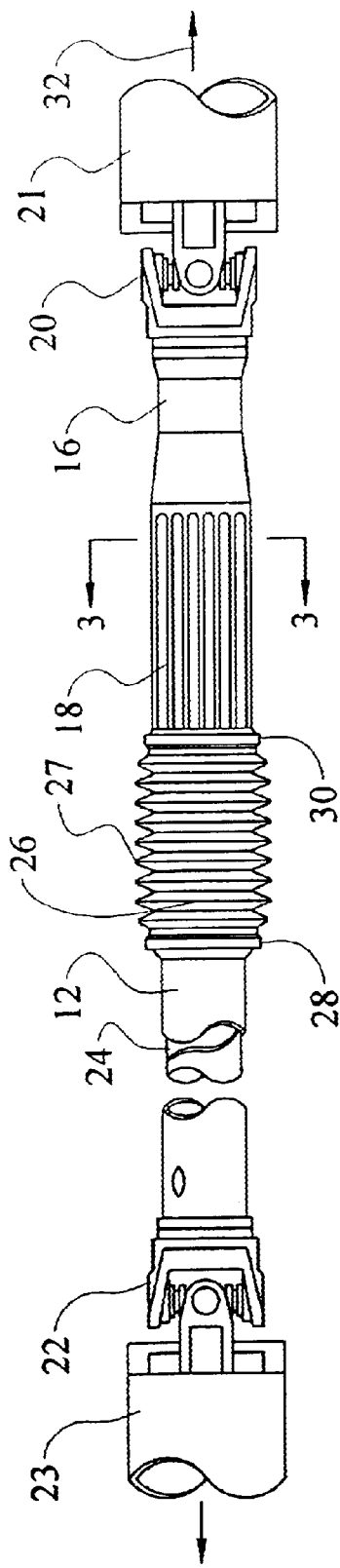
FIG. 2 is an assembled side view of the shaft shown in FIG. 1.

Referring to the drawings, FIGS. 1–4 have been incorporated from the '221 patent for a double-tube "slip-in-tube" vehicle shaft. As shown, a double-tube "slip-in-tube" vehicle shaft 10 includes a generally tubular and hollow first member 16 having a splined portion 18 circumferentially formed upon an interior surface 19. The shaft 10 further includes a second generally tubular and hollow member 12 having a splined portion 14 circumferentially formed upon an exterior surface 15. The splined portion 14 of the second member 12 is adapted to selectively and cooperatively intermesh with the splined portion 18 of the first member 16. The first and second members 16, 12 may have various diameters 52, 50. In one non-limiting embodiment, the diameters are approximately one and three-quarter (1.75) inches, respectively, to about five (5.0) inches. Other diameter values may alternatively be utilized.

The second member 12 is adapted to selectively, movably, and telescopically penetrate the first member 16. The splined portions 18, 14 of the first and second members 16, 12 cooperatively intermesh in the usual and known manner. The region of the shaft 10 where this penetration or interaction between the first and second members 16, 12 occurs may be referred to as an overlapping region, whereas the region of the shaft where penetration or interaction does not occur may be referred to as a non-overlapping region.

The first member 16 is coupled, by the use of a conventional flange 20, to a conventional transmission 21, while the second member 12 is coupled, by the use of a conventional flange 22, to a conventional differential 23. The torque, supplied by the transmission 21 is communicated to the first member 16 and then, by use of the intermeshed splined portions 18, 14 of the first and second members 16, 12, is communicated to the second member 12 and to the differential 23. The cooperating splined portions 18, 14 allow the second member 12 to dynamically move along the longitudinal axis 32 of the shaft 10 in response to changes in the distance between the transmission 21 and the differential 23.

The first and second members 16, 12 may be manufactured from conventional and commercially available lightweight aluminum material. As an example, the first and second members 16, 12 are preferably a commercially available "6061-T4" type of aluminum or aluminum alloy material. The splines are preferably "cold formed" upon the surfaces 19, 15 by the use of the conventional "Grob" process, which is provided by the Ernst Grob AG company of Mannedorf, Switzerland. Moreover, the splined portions 18, 14 of the first and second members 16, 12 are preferably hardened or "anodized" in accordance with the commercially available Metalast anodizing process, which is provided by the Metalast International Corporation of Minden, Nevada. More particularly, the splined portions 18, 14 of the first and second members 16, 12, in one embodiment, are anodized with a layer of "Metalast hardcoat" material having a thickness of about 0.002".

Figure 4:
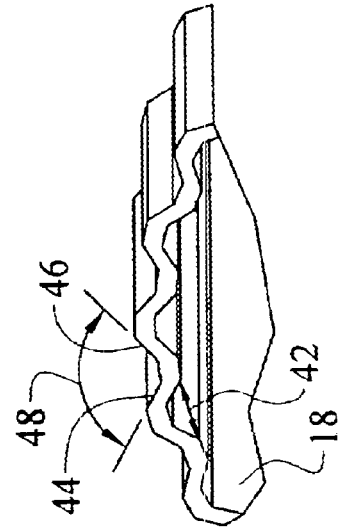
FIG. 4 is a fragmented perspective view of the portion of the shaft shown in FIG. 3, which illustrates portions of the splines.
Figure 3:
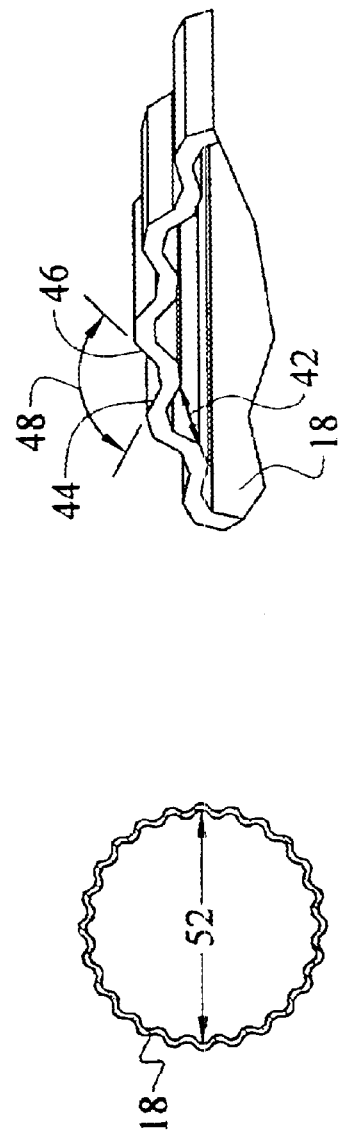
FIG. 3 is a side view of the shaft shown in FIG. 2, taken along view line 3—3.

The use of such anodized aluminum and cold-formed splined portions 18, 14 allows for a relatively lightweight shaft 10 that substantially reduces the amount of vibration and noise which emanates from the operatively formed shaft 10. The relatively lightweight aluminum construction allows the first and second members 16, 12 to be designed with relatively large diameters 52, 50, while minimizing overall weight. The relatively large diameter of the members 16, 12 efficiently distributes the applied axial loads over a larger surface area, thereby allowing the shaft 10 to support relatively larger torques at relatively higher speeds than prior shaft assemblies. Further, this relatively light-weight design allows for relatively long splined portions 18, 14 which, in one embodiment, may have a substantially identical length 56 approximately equal to at least three times the diameter 52 of the first member 16 (e.g., approximately 13.5 inches). In alternative embodiments, the splined portions 18, 14 may have lengths extending approximately half way along the first and second members 16, 12. The anodized aluminum splines also, as is best shown in FIGS. 3 and 4, allow for relatively large splined mating surfaces (or "working areas"). In one embodiment, the working areas have a "tooth thickness" 42 equal to about five to about ten millimeters. The splines allow for distribution of the axial loads imparted upon the spine portions 18, 14 and are effective to reduce the overall wear of the splines and the assembly 10.

In one embodiment, each end wall 44, 46 of each spine cooperatively forms an angle 48 of about forty degrees (40°) to eighty degrees (80°), although other angular configurations may be utilized. Further, while a segment of the splined portion 18 of the first member 16 is shown in FIG. 3, it should be realized that the splined portion 14 of the second member 12 is substantially similar. It should be appreciated that the relatively long length of the splined portions 18, 14 reduces the amount of noise and vibrations generated from the shaft 10.

A boot 26, which functions to prevent contaminants from entering the shaft 10, is mounted to the shaft 10. Preferably, the boot 26 is a conventional boot that encapsulates at least the overlapping region of the first and second members 16, 12. In order to aptly prevent contaminants from entering the shaft 10, the boot 26 is preferably mounted to the shaft 10 in a substantially airtight configuration. The boot 26 is preferably fastened at a first end to the first member 16 and at a second end to the second member 12 using conventional fasteners. Alternatively, any suitable method capable of adequately fastening the boot 26 to the shaft 10 may be used. As shown in FIG. 1, the boot 26 is preferably corrugated to allow for relative axial movement between the first and second members 16, 12. Alternatively, any suitable configuration capable of allowing the boot 26 to axially expand and contract without compromising its imperviousness to contaminants may be used. In one embodiment, in addition to being axially expandable, the boot 26 is radially expandable. The boot 26 is preferably constructed of a thermoplastic polymer. However, any suitable material capable of expanding and contracting as air-pressure changes within the boot 26 may be used.

The prior art shaft 10, as shown in FIGS. 1–4, contains sealed air inside the hollow shaft members 12, 16 with no venting means. As a result, the sealed air inside the hollow shaft members 12, 16 of the shaft 10 undergoes extreme changes in pressure during compression and decompression plunging motions of the shaft 10. To alleviate this problem, the venting system of the present invention minimizes pressure changes within the shaft 10.

FIGS. 5–6 show the first and second members 16, 12 and the boot 26 cooperating to form a substantially airtight enclosure that minimizes pressure changes within the inner cavity of the first member 16. In a preferred embodiment, the vent 80 is located on the shaft member 16 and under the boot 26. As shown in FIG. 6, the vent 80 is preferably at a location on the shaft 10 where the first and second members 16, 12 do not interact, which is the non-overlapping region of the shaft 10. This embodiment allows for maximum ventilation between the shaft 10 and the boot 26, because ventilation occurs throughout the entire plunging and reverse plunging processes. However, any suitable location on the shaft 10 and under the boot 26 may be used. In one embodiment, the vent 80 is located in the first member 16. However, it should be appreciated that the vent 80 may alternatively be located in the second member 12. The vent preferably has a diameter of approximately 0.06 inches. However, any suitably sized vent may be used. The vent may be formed in a variety of ways such as through drilling or molding. Any suitable method capable of creating the vent may be used.

As suggested above, shaft venting takes place through the vent 80. In operation, when the shaft members 12, 16 compress during a plunging motion of the shaft 10, the high-pressure air inside the members 12, 16 vents by passing through the vent 80. As the high-pressure air passes from the shaft 10 into the boot 26, the boot 26 expands, thereby reducing the air-pressure within the shaft 10. As a result, the internal shaft pressure is maintained at an operational level. Similarly, when the shaft members 12, 16 decompress during a reverse plunging motion of the shaft 10, the higher-pressure air of the boot 26 vents by passing through the vent 80 into the shaft 10. As the high-pressure air passes from the boot 26 into the shaft 10, the boot 26 contracts, thereby increasing the air pressure within the shaft 10. Again, the internal shaft pressure is maintained at an operational level. In such a manner, the shaft venting continually equalizes the internal shaft pressure with that of the boot 26.

At the same time, external elements, such as, water, dirt, or salt are prevented from contaminating the shaft 10 via the vent 80 due to the structure of the boot 26 encapsulating the vent 80. In particular, the boot 26 is preferably mounted to the shaft 10 in a substantially airtight configuration. Most external elements are larger than the minimal space between the boot 26 and the shaft 10 and are, therefore, unable to pass into the shaft 10 through the vent 80. As a result, premature wear or corrosion is avoided.

It is to be understood that the invention is not to be limited to the exact construction and/or method which has been illustrated and discussed above, but that various changes and/or modifications may be made without departing from the spirit and the scope of the invention.

What is claimed is:

1. A shaft for a vehicle, comprising:

a first member having an internal spline and defining an inner cavity;

a second member having an external spline, wherein the external spline of the second member and the internal spline of the first member cooperatively allow an axial sliding movement of the second member into the inner cavity of the first member and substantially prevent rotational movement between the first and second members, wherein one of the first and second members defines a vent communicating with the inner cavity; and a boot mounted over the vent and adapted to substantially prevent contaminants from entering the inner cavity through the vent, wherein the first and second members and the boot cooperatively form a substantially airtight enclosure.

2. The shaft of claim 1, wherein the first end of the boot is mounted to the first member and the second end of the boot is mounted to the second member.

3. The shaft of claim 2, wherein the boot is radially and axially expandable.

4. The shaft of claim 3, wherein the boot is constructed of a thermoplastic polymer.

5. The shaft of claim 1, wherein the vent is defined in a non-overlapping region of the shaft to allow for maximum ventilation.

6. The shaft of claim 5, wherein the vent is located in the second member.

7. The shaft of claim 6, wherein the vent is approximately 0.06 inches in diameter.

* * * * *